US008427535B2

(12) United States Patent
Davis

(10) Patent No.: US 8,427,535 B2
(45) Date of Patent: Apr. 23, 2013

(54) PERSONAL GROOMING VISUAL DISPLAY SYSTEM

(76) Inventor: Rick Davis, Battle Creek, MI (US)

(*) Notice: Subject to any disclaimer, the term of this patent is extended or adjusted under 35 U.S.C. 154(b) by 897 days.

(21) Appl. No.: 12/455,769

(22) Filed: Jun. 5, 2009

(65) Prior Publication Data

US 2009/0303320 A1    Dec. 10, 2009

Related U.S. Application Data

(60) Provisional application No. 61/131,213, filed on Jun. 7, 2008.

(51) Int. Cl.
*H04N 7/18* (2006.01)

(52) U.S. Cl.
USPC ............. 348/77; 348/159; 348/158; 348/143; 705/27.2; 396/2

(58) Field of Classification Search .............. 348/77, 348/143, 151, 158, 159; 705/27.2, 27.1; 345/619, 629, 630, 634, 641; 132/212, 120, 132/219, 148, 150; 206/581; 396/14, 2, 396/1
See application file for complete search history.

(56) References Cited

U.S. PATENT DOCUMENTS

| 7,054,668 | B2* | 5/2006 | Endo et al. | 455/566 |
| 7,171,114 | B2* | 1/2007 | Milton | 396/287 |
| 2003/0041871 | A1* | 3/2003 | Endo et al. | 132/301 |
| 2006/0007303 | A1* | 1/2006 | Milton | 348/77 |
| 2009/0046145 | A1* | 2/2009 | Simon | 348/77 |
| 2009/0051769 | A1* | 2/2009 | Kuo et al. | 348/159 |
| 2009/0147081 | A1* | 6/2009 | Hanson | 348/77 |
| 2011/0298929 | A1* | 12/2011 | Garcia et al. | 348/159 |

* cited by examiner

*Primary Examiner* — Kenneth R Coulter
(74) *Attorney, Agent, or Firm* — Robert M. Downey, P.A.

(57) ABSTRACT

A personal grooming apparatus includes a high definition monitor, an overhead bracket providing a canopy above the monitor, one or more cameras supported on the overhead bracket for viewing a user's face, as well as the sides and back of the user's head, and possibly other areas of the user's body. An arrangement of lights supported on the bracket illuminate the various camera views. Controls are provided for independent control of the several lights (e.g., ON/OFF, dimming) the cameras (e.g., camera activation, zoom function, camera view selection), and the monitor. A docking station accommodates a handheld unit. The docking station is provided with a wireless receiver port for communicating with the handheld unit. The handheld unit includes a camera and LED lighting for close-up views that are displayed on the monitor. The handheld unit is adapted for receiving various attachment tools and grooming devices.

8 Claims, 5 Drawing Sheets

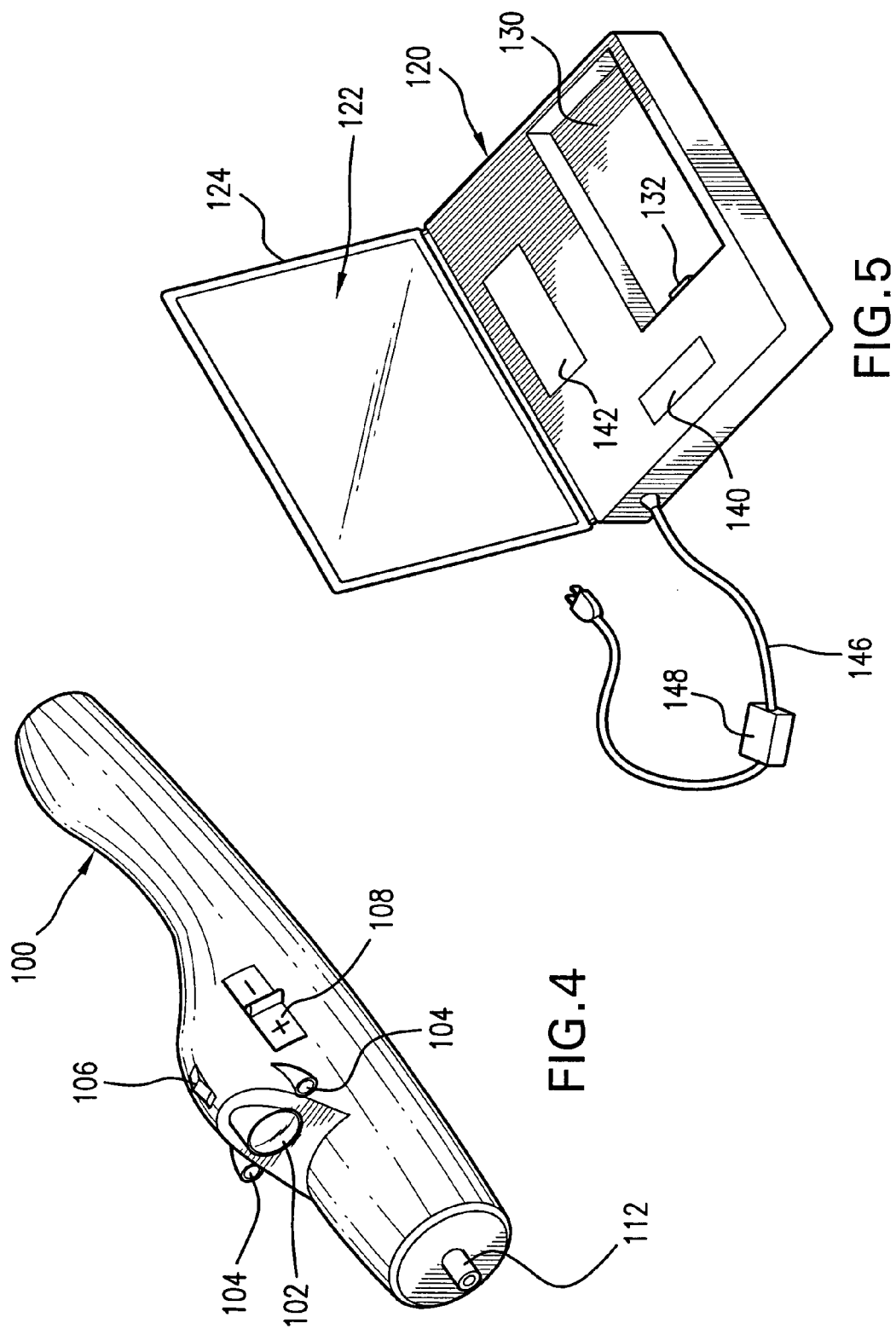

PERSONAL GROOMING VISUAL DISPLAY SYSTEM

BACKGROUND OF THE INVENTION

This non-provisional application is based on provisional application Ser. No. 61/131,213 filed on Jun. 7, 2008.

FIELD OF THE INVENTION

The present invention relates to grooming aids, and more particularly, to a personal grooming visual display system that provides a monitor, one or more cameras, lights, and controls for selecting various camera views and lighting conditions for close-up viewing of areas of a user's face, head and other areas of the body while performing various grooming, personal hygiene and first aid procedures.

DISCUSSION OF THE RELATED ART

Most people perform routine grooming and personal hygiene procedures in front of a mirror so that they can view performance of the procedure and the results. However, use of a mirror is not always effective to sufficiently view areas of the face, ears, head and other parts of the body. Factors such as the distance between the person and the mirror, or lighting conditions, failing eyesight of the person, and difficult viewing angles (e.g., back of the head, ears, back, etc.), among others, can make it extremely difficult to view specific areas while performing various procedures. For example, it is often difficult to completely view one's entire head when combing, trimming and fixing one's hair in the mirror. In particular, it is difficult view the sides, top and back of the head. Other grooming activities, such as trimming nose hair and ear hair, and plucking eyebrows and other unwanted hairs can prove to be challenging when simply using a mirror. Moreover, as people get older, and their eyesight starts to fail, they are unable to view areas of the face, head and other parts of body with any degree of detail. Thus, people with failing eyesight may be unable to notice nose hair, ear hair and other undesirable conditions when looking in the mirror. For this reason, people with failing vision are not always capable of adequately grooming themselves. And, regardless of age, eyesight and physical condition, it is always difficult for anyone to see the back of their head or body.

Accordingly, there remains a definite and urgent need for a personal grooming aid that allows persons of all ages and physical condition to adequately view areas of the face, ears, head and body with sufficient detail to perform necessary grooming and personal hygiene activities, first aid procedures, and other functions.

SUMMARY OF THE INVENTION

The present invention is directed to personal grooming system that provides a person with a detailed view of select areas of the face, ears, hair, back and other areas of the person's body so that the person can perform various grooming and personal hygiene procedures. The personal grooming system includes a high definition flat screen monitor, an overhead bracket providing a canopy above the monitor, one or more cameras supported on the overhead bracket and an arrangement of lights supported on the bracket for illuminating the select areas of the user's face, head and body being viewed by the one or more cameras. The monitor and bracket can be wall mounted or, alternatively, supported on a stand to allow portability of the system from one location to another, such as from a bathroom to a user's bedroom. A control panel includes independent controls for operating the lights, cameras, and the monitor. Specifically, light controls allow independent actuation (i.e., ON/OFF) and dimming of any of the lights. Camera controls allow for camera activation, zoom-in and zoom-out lens operation, and camera view selection. The cameras can be fixed in position on the overhead rail or, alternatively, one or more cameras can be moveable on the rail using control commands on the control panel or a handheld remote. Controls are also provided for actuating the monitor (i.e., ON/OFF) as well as possibly other functions, such as color control, contrast, brightness and split screen functions. The monitor may be combined with a viewable T.V. picture, thereby allowing the user to watch a television program while simultaneously performing personal grooming tasks.

The system may further be provided with a docking station, preferably on the monitor housing, for accommodating a handheld unit. The docking station is provided with a wireless receiver port for communicating with the handheld unit. The handheld unit includes a camera and LED lighting for close-up views of select areas of the user's face, ears, back, and other parts of the body. The close-up views captured by the camera on the handheld unit are displayed on the monitor. The handheld unit is further adapted for receiving various attachment tools and devices. For instance, the handheld unit may be adapted for attachment of a nose hair trimmer, a beard and moustache trimmer, tweezers, and a nail buffer. A carry case includes a compartment for holding the handheld unit. The carry case is further provided with a mini monitor, a docking station with a docking port and a control pad for operating various functions on the handheld unit and mini monitor. Power is supplied by a removable AC power cord and internal rechargeable battery.

BRIEF DESCRIPTION OF THE DRAWINGS

For a fuller understanding of the nature of the present invention, reference should be made to the following detailed description taken in conjunction with the accompanying drawings in which:

FIG. 4 is an isolated perspective view of a handheld unit for use in conjunction with the personal grooming visual display apparatus;

FIG. 5 is an isolated perspective view of a carry case and mini display for use in conjunction with the handheld unit.

Like reference numerals refer to like parts throughout the several views of the drawings.

DETAILED DESCRIPTION OF THE PREFERRED EMBODIMENTS

The personal grooming and visual display system is shown throughout the several views of the drawings. The system includes a wall mounted apparatus, generally indicated as 10, having a flat screen high definition monitor 12 within a housing 14. In a preferred embodiment, the housing 14 mounts to a wall surface at a preferred height so that a user can easily view the flat screen monitor 12 when standing or, alternatively, when in a seated position. Ideally, the apparatus 10 is mounted so that the monitor 12 is viewable while in a standing position, so that the user can view themselves while getting dressed as well as when performing various grooming and personal hygiene procedures.

Figure 1:
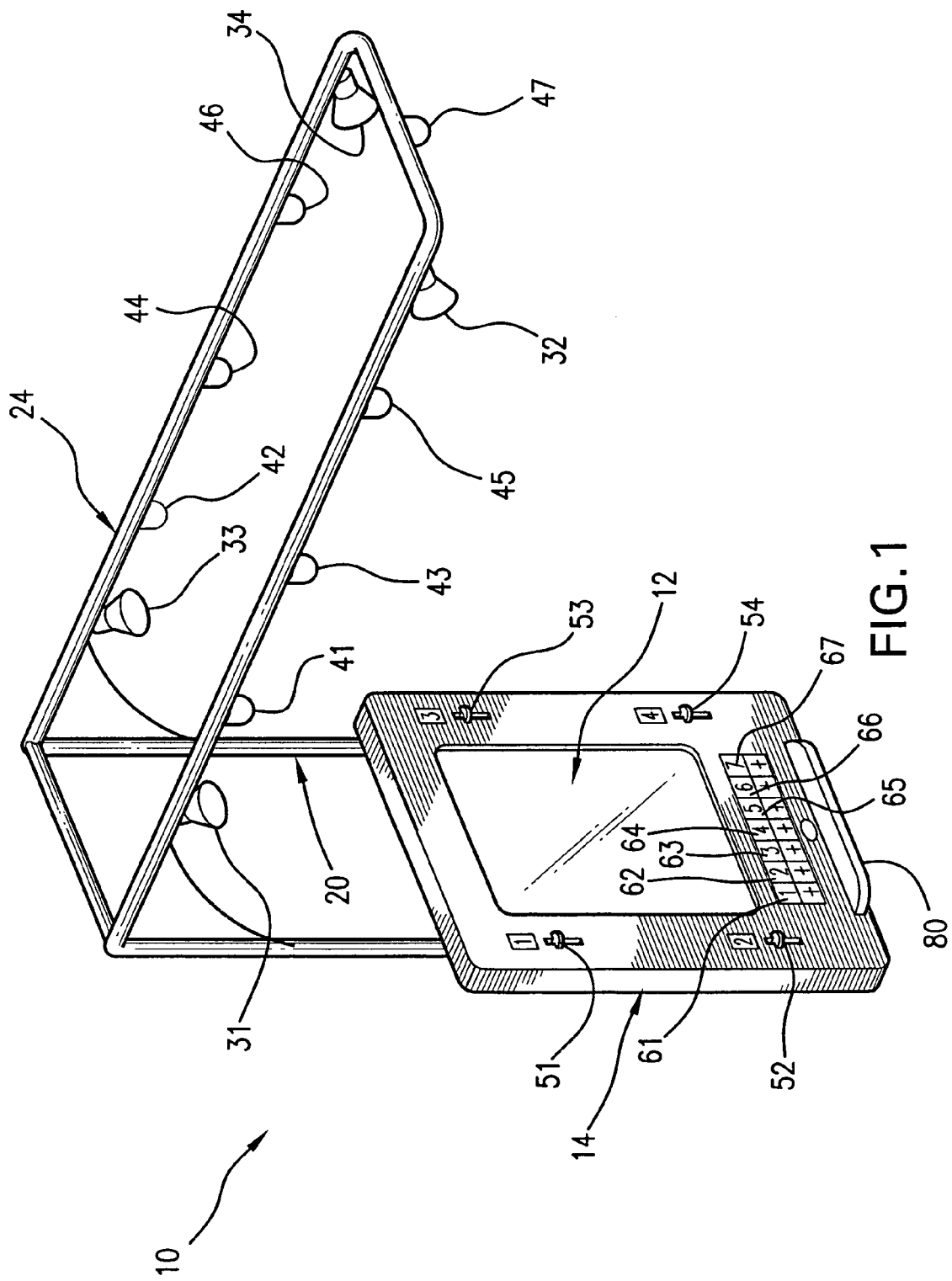
FIG. 1 is perspective view showing the personal grooming visual display apparatus of the present invention, in accordance with a preferred embodiment, and including a flat screen high definition monitor and housing with controls and a support bracket with an arrangement of cameras and lights.
Figure 2:
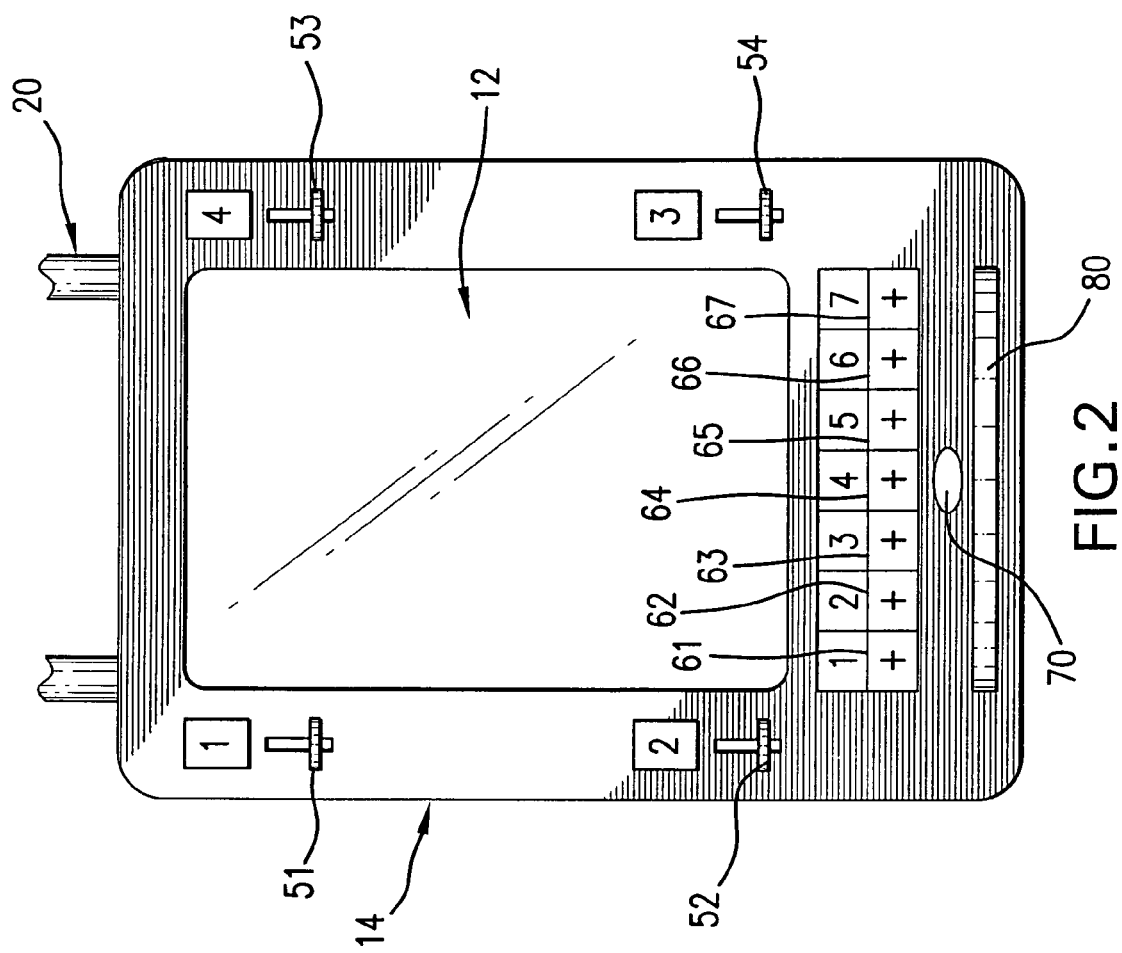
FIG. 2 is an isolated front elevational view of the high definition flat screen monitor and housing with camera and light controls and a docking station for a handheld unit.
Figure 3:
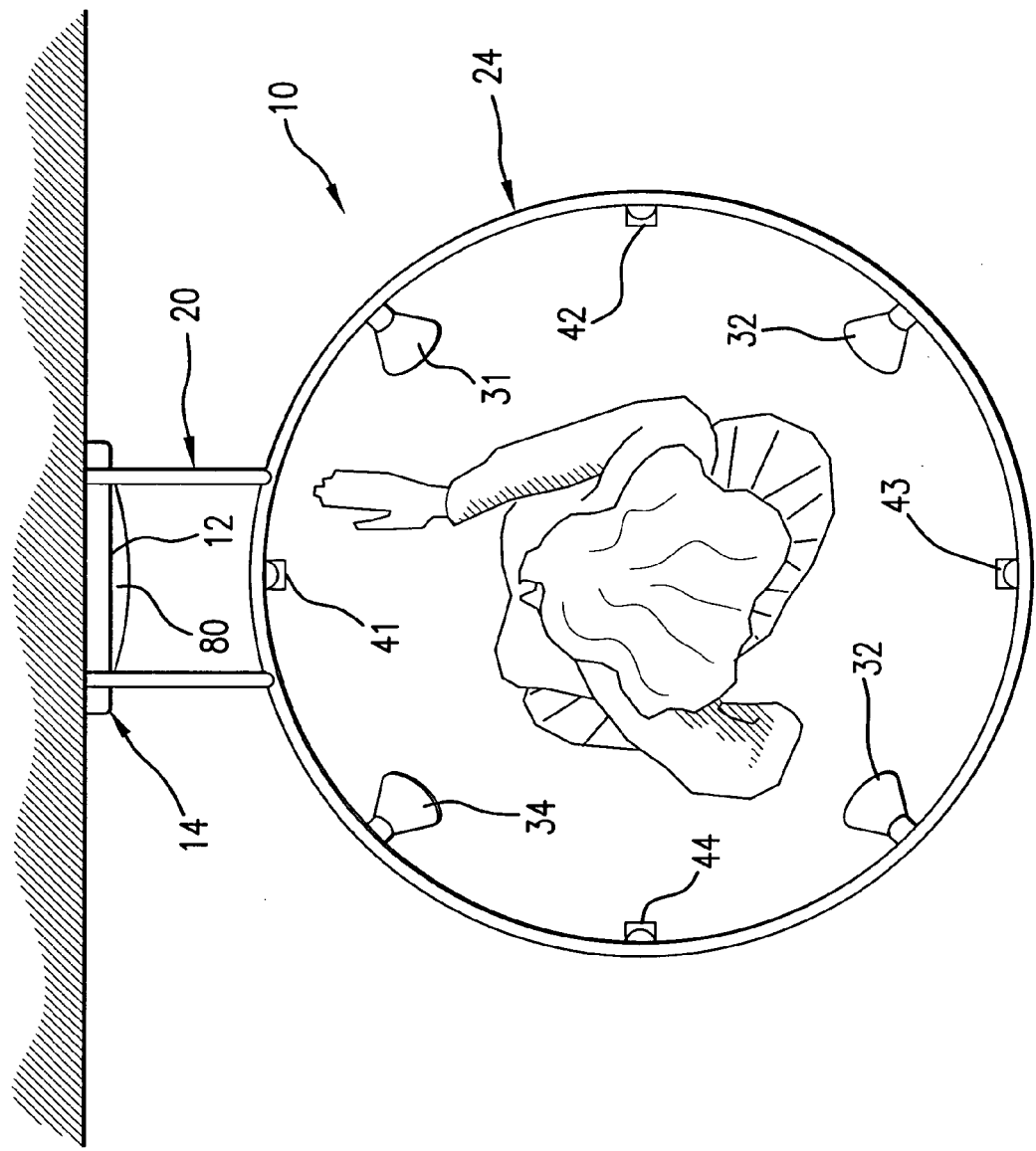
FIG. 3 is a top plan view showing a preferred embodiment of the overhead bracket supporting the arrangement of cameras and lights relative to a user standing below the overhead bracket and viewing the high definition flat screen monitor.

An overhead bracket 20 extends upwardly from the monitor housing 14 and is formed in a generally L-shaped or 90 degree bend to position a canopy rail structure 24 above the user. The overhead canopy rail structure 24 may be square or rectangular in shape, as seen in FIG. 1 or, alternatively, a circular shape as seen in FIG. 3. The overhead canopy rail structure 24 supports and arrangement of cameras 41-47 for select view around the user so that the user can view specific areas of their head and body. Specifically, selective activation and control of the several cameras 41-47 allows the user to view their face, either side of their head, including the ears, the back of the head, the top of the user's head, as well as the front, sides and back of the user's torso and legs. The overhead canopy rail structure 24 further supports and arrangement of lights 31-34 for illuminating the select area of the user's head and body, thereby enabling a clearer and brighter camera image of the areas selected for view by the user. In an alternative embodiment, the overhead canopy rail structure 24 may support a single camera that moves around the rail structure at the control and command of the user.

The monitor housing 14 includes an arrangement of controls for operating the lights and cameras. Specifically, independent light controls 51-54 are provided for activating any one or more of the lights 31-34 as selected by the user. Additionally, the light controls provide for a dimming function, allowing control of the brightness of any of the activated lights 31-34.

The monitor housing 14 is further provided with camera controls 61 67 for selectively activating any of the cameras 41-47, thereby enabling a select view of the user's head or body to appear on the monitor. The camera controls further allow for a zoom-in and zoom-out function for any of the selected camera views. Monitor controls 70 are further provided, allowing operation of the monitor between the ON and OFF conditions, as well as possibly other functions including, but not limited to, color control, brightness, contrast and split screen functions for simultaneously viewing multiple images.

The personal grooming and visual display system of the present invention further includes a handheld unit 100. A docking station 80 on the monitor housing 14 accommodates the handheld unit 100 and includes a wireless receiver port for communicating with the handheld unit. The handheld unit 100 includes a high resolution camera 102, one or more LED lights 104, a power control switch 106 (ON/OFF), and a camera zoom control 108 for zoom-in and zoom-out camera function. A wireless transmitter within the handheld unit 100 sends wireless signals to a receiver within the monitor housing of the wall mounted apparatus, thereby allowing images viewed by the high resolution camera 102 of the handheld unit to be displayed on high definition flat screen monitor 12. The handheld unit 100 is further provided with an attachment mechanism 112 for interchanging attachment of various tools and devices, such as, but not limited to, a nose hair trimmer, a beard and moustache trimmer, tweezers and a nail buffer. Accordingly, the user can perform various grooming activities, such as trimming nose hairs and/or ear hairs using the handheld unit 100 while viewing a close-up image of the nostrils or ears on the flat screen monitor 12 of the wall mounted apparatus 10.

The personal grooming and visual display system further includes a carry case 120 with a built in mini flat screen monitor 122, such as an LCD display. In a preferred embodiment, the flat screen monitor 122 is incorporated within a hinged cover 124 of the carry case and is viewable when the cover 124 is operated to the open position, as seen in FIG. 5. The carry case 120 is specifically intended for holding the handheld unit 100 when used independently of the wall mounted apparatus 10, such as when traveling. The carry case 120 includes a compartment 120 that is specifically sized to hold the handheld unit 100 therein. The compartment 120 is provided with a docking station with a docking port 132 that allows for recharging of the rechargeable batteries in the handheld unit. A control pad 142 on the carry case allows for control of various functions, including operation of the mini monitor 122. A wireless receiver 140 communicates with the wireless transmitter of the handheld unit so that images viewed by the high resolution camera 102 of the handheld unit 100 can be viewed on the mini monitor 122 when the handheld unit is separated from the carry case. A removable AC power cord 146 allows the mini carry case 120 to be plugged into a standard 110 volt outlet. A step down transformer 148 on the power cord 146 reduces voltage for powering operation of the carry case functions, including the mini monitor 122, as well as for recharging an internal within the carry case and the rechargeable battery of the handheld unit 100 when the handheld unit is plugged into the docking port 132.

Figure 6:
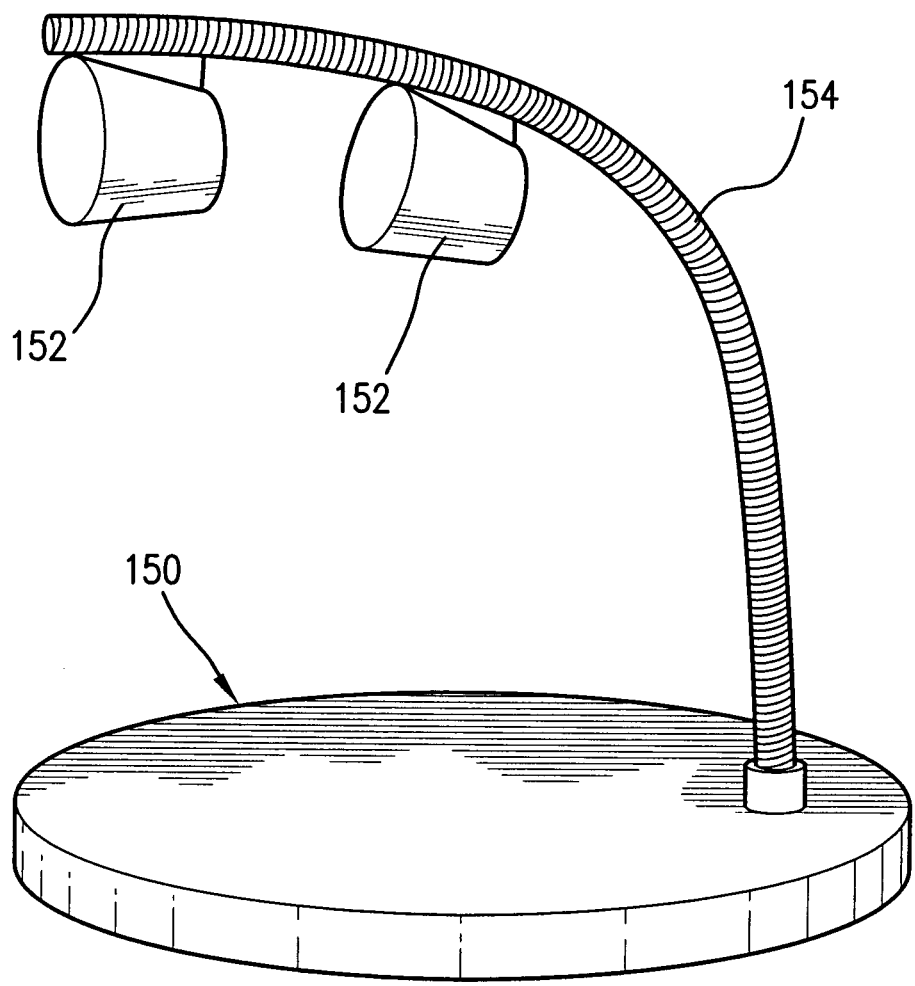
FIG. 6 is a perspective view of a cradle for holding the handheld unit.

FIG. 6 illustrates an optional stand 150 for holding the handheld unit 100 during use, allowing the user to easily grasp the handheld unit while performing various grooming and personal hygiene procedures. The stand has cradles 152 on a bendable and flexible arm 154 for holding the cradle 152 in optimal position for grasping the handheld unit.

The personal grooming visual display system of the present invention is useful when performing a variety of grooming and personal hygiene procedures, such as when combing and fixing one's hair, getting dressed, tweezing and trimming facial and body hair, applying makeup, brushing and cleaning teeth, as well as looking at various areas of the body, such as one's back, that are otherwise not easily seen. Viewing various areas of the body that are not easily seen, such as the back, allows for monitoring changes, such as the appearance of new moles or growths, as wells as discoloration of existing moles that may be indicative of skin cancer. Accordingly, the personal grooming visual display system of the present invention can be useful in early detection of medical conditions. The personal grooming display system is further useful for people who are experiencing the effects of age, and particularly diminishing eyesight and flexibility. The functions of the system of the present invention, including high definition close-up views of select areas of the body make is much easier for people with failing vision to adequately groom themselves. For all users, the personal grooming visual display system provides individuals with more self-confidence about they look and how they are seen by others.

While the present invention has been shown and described in accordance with preferred and practical embodiments thereof, it is recognized that departures from the instant disclosure are fully contemplated within the spirit and scope of the invention.

What is claimed is:

1. A personal grooming visual display system comprising:

a monitor within a monitor housing;

an overhead structure;

a plurality of cameras mounted on said overhead structure at spaced intervals, and said plurality of cameras being structured and disposed for viewing select areas of a user at varying angles, and said plurality of cameras being further structured and disposed for communicating with said monitor for displaying the viewed select areas of the user on said monitor;

a handheld unit including at least one mini camera and at least one mini light, said mini camera being structured and disposed for viewing select areas of the user, and said handheld unit being structured and disposed for communicating with said monitor for displaying the viewed select areas of the user on the monitor;

said monitor being structured and disposed for simultaneously displaying a plurality of viewed selected areas of the user;

at least one light supported by said overhead structure, and said at least one light being structured and disposed for illuminating the viewed select areas of the user at varying angles; and a plurality of controls on said monitor housing, and said plurality of controls being structured and disposed for independently controlling said monitor, said plurality of cameras, said at least one light, said mini camera, and said mini light.

2. The system as recited in claim 1, further comprising:
a docking station located on said monitor housing, and said docking station being structured and disposed for accommodating said handheld unit.

3. The system as recited in claim 1 wherein said handheld unit is structured and disposed for converting images viewed by said at least one mini camera into digital data and transmitting said digital data externally of said handheld unit via wireless signals.

4. The system as recited in claim 3, further comprising:
a receiver structured and disposed for receiving the wireless signals; and
a wireless receiver port located within said docking station, and said wireless receiver port being structured and disposed for communicating with said receiver.

5. The system as recited in claim 4 wherein said monitor is structured and disposed for communicating with the receiver and reading the digital data, and being further structured for converting the digital data into images displayed by said monitor.

6. The system as recited in claim 1 wherein the handheld unit is adapted for supporting a plurality of attachment tools and devices.

7. The system as recited in claim 1 wherein said monitor is housed in a carrying case.

8. The system as recited in claim 7, further comprising:
a compartment located in said carrying case, and said compartment being structured and disposed for accommodating said handheld unit; and
a docking port located in said compartment, and said docking port being structured and disposed for charging said handheld unit.

* * * * *